United States Patent
Ong et al.

(10) Patent No.: US 8,103,298 B2
(45) Date of Patent: Jan. 24, 2012

(54) MULTIPLE PTT FUNCTIONALITY

(75) Inventors: Choon Gim Ong, Penang (MY); Pey Hann Ooi, Penang (MY); Ui Ping Cheah, Penang (MY); Kah Soon Ang, Perak (MY)

(73) Assignee: Motorola Solutions, Inc., Schaumburg, IL (US)

( * ) Notice: Subject to any disclaimer, the term of this patent is extended or adjusted under 35 U.S.C. 154(b) by 882 days.

(21) Appl. No.: 12/125,207

(22) Filed: May 22, 2008

(65) Prior Publication Data

US 2009/0291646 A1 Nov. 26, 2009

(51) Int. Cl.
*H04B 7/00* (2006.01)
(52) U.S. Cl. .......... 455/518; 455/519; 455/521; 455/516
(58) Field of Classification Search .................. 455/518, 455/519, 521, 516, 63.3
See application file for complete search history.

(56) References Cited

U.S. PATENT DOCUMENTS

| | | | |
|---|---|---|---|
| 5,823,326 A | 10/1998 | Saito et al. | |
| 6,785,341 B2 | 8/2004 | Walton | |
| 6,801,165 B2 | 10/2004 | Fang | |
| 7,054,378 B2 | 5/2006 | Walton | |
| 7,072,413 B2 | 7/2006 | Walton | |
| 7,483,682 B2 * | 1/2009 | Williams | 455/180.1 |
| 7,536,191 B2 * | 5/2009 | Luo et al. | 455/457 |
| 2005/0143135 A1 * | 6/2005 | Brems et al. | 455/564 |
| 2006/0040695 A1 * | 2/2006 | Yoon et al. | 455/519 |
| 2006/0147028 A1 * | 7/2006 | Hancock | 379/387.01 |
| 2007/0035527 A1 | 2/2007 | Cheon et al. | |
| 2007/0076660 A1 | 4/2007 | Sung | |
| 2007/0197248 A1 * | 8/2007 | Reich et al. | 455/518 |

FOREIGN PATENT DOCUMENTS

| | | | |
|---|---|---|---|
| EP | 1168777 | * | 1/2002 |
| KR | 10-2005-0115708 A | | 12/2005 |
| KR | 10-0692001 B1 | | 3/2007 |
| WO | WO2004107787 A2 | | 12/2004 |

OTHER PUBLICATIONS

PCT Search Report Dated Dec. 22, 2009.

* cited by examiner

*Primary Examiner* — Duc M Nguyen
(74) *Attorney, Agent, or Firm* — Anthony P. Curtis; Daniel R. Bestor (57) ABSTRACT

A communication device and method are presented. The device is in a network of devices of different groups. The device contains a push-to-talk (PTT) button, a channel selector, and a keyboard containing hard or soft keys. The channel selector selects an initial frequency at which to receive and transmit, dependent on the group to which the device belongs. The device transmits when the PTT button is pressed. If a multiple PTT function is activated by software in the device, at least some of the keys are used to select a new transmission frequency. The device receives at the initial frequency independent of the transmission frequency. The multiple PTT function can be activated by a dedicated soft or hard key or a key on the keyboard that serves multiple functions. The frequency selection provided by the keys is dependent on the channel and the device group.

20 Claims, 5 Drawing Sheets

MULTIPLE PTT FUNCTIONALITY

TECHNICAL FIELD

The present application relates to push-to-talk handsets. In particular, the application relates to a handset having multiple communication functionality.

BACKGROUND

Push-to-talk (PTT) handsets have been used for some time by emergency personnel but also have recently begun to grow in general popularity. PTT handsets contain a single PTT button that enables the user to communicate with a group of users on the same channel. The communications between the PTT handsets occur at one of a set of isolated frequencies that is selected by a knob on the PTT handsets. To communicate with users on other channels, the user manually switches the channel at the PTT handset thereby changing the transmission and reception frequency. Each time the channel is switched, however, it takes a certain amount of set up time to establish the PTT device on the newly selected channel. This can cause the PTT handset to miss valuable incoming communication on both the previous channel and the new channel.

While for casual users, this may not be troublesome, it may be particularly problematic for emergency personnel who often have to communicate with multiple groups of users on different channels. In emergency situations, such personnel may need to communicate with the different groups on different frequencies relatively quickly. However, as each handset receives and transmits at a single selected frequency, each group with whom the user wishes to communicate thus requires the user to carry an additional handset. As a result, the emergency personnel often carry multiple handsets to ensure they can monitor and communicate with multiple groups simultaneously. The use of multiple radios minimizes information loss as well as the cycle time to transmit and receive.

However, carrying multiple radios is cumbersome and potentially dangerous. In particular, as above, emergency situations may require rapid instructions and quick responses to inquiries to avoid injury. However, possessing a variety of handsets may be detrimental to responding in a timely fashion as the user may have search to determine the radio requiring information. Further, multiple groups may be communicating simultaneously, causing the voice streams from the different radios to overlap and thereby creating confusion. In addition, if the user has to juggle multiple handsets, it is significantly more likely that one of the handsets will be misplaced or dropped, the latter potentially resulting in catastrophic damage to the handset.

BRIEF DESCRIPTION OF THE DRAWINGS

Embodiments will now be described by way of example with reference to the accompanying drawings, in which.

DETAILED DESCRIPTION

A communication network, device, and method of communication are presented in which a single device can be used to transmit information on various frequencies without manually switching the channel every time communication with users in other frequencies is desired. If the receiving frequency is unchanged, the information loss for transmission at the receiving frequency is minimized as the user continuously receives information at the receiver frequency. The user is able to transmit at any preprogrammed transmitter frequency, including the receiving frequency. To receive at different frequencies, the channel can be switched, which changes both the initial transmit and receive frequencies. This minimizes the number of devices carried while still providing the functionality to communicate with multiple groups on different frequencies.

Figure 1:
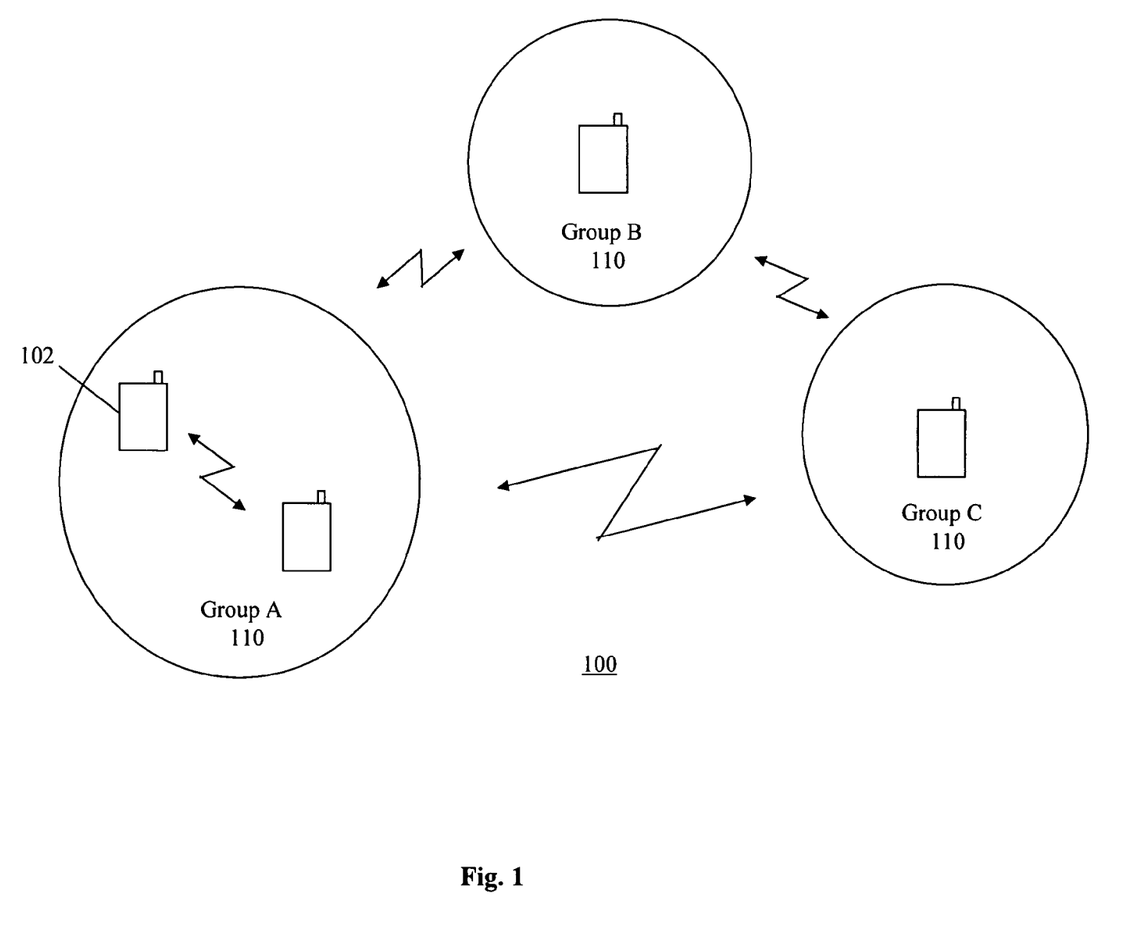
FIG. 1 illustrates a network according to one embodiment.

A communication network is shown in FIG. 1. The network 100 includes a plurality of communication devices 102 such as handsets. Each handset belongs to a group 110 of one or more groups in the network 100. As shown in FIG. 1, the handsets 102 in group A, group B, and group C communicate with handsets 102 within the same group or in different groups. For convenience, intermediate devices and controllers that may be present between the communication devices 102 are not shown in FIG. 1.

Figure 2:
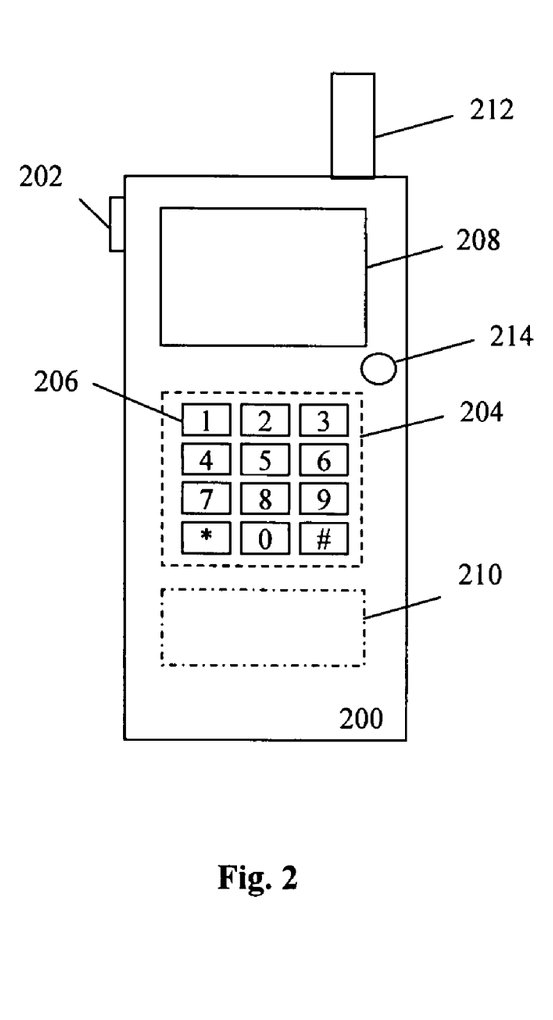
FIG. 2 illustrates a device according to one embodiment.

One embodiment of a communication device of FIG. 1 is shown by the handset 200 of FIG. 2. The handset 200 includes a PTT button 202, an alpha-numeric keypad 204 containing keys 206, an antenna 212, a channel selector 214, and, optionally, a display 208 and/or a touch panel 210. The PTT button 202 permits the handset 200 to transmit a PTT signal when manually pressed and receive when depressed. Once the PTT button 202 is pressed, the PTT button 202 can be locked in the active position using a locking mechanism (not shown) until again depressed or can be active only while the PTT button 202 is manually held in the active position. The keys 206 in the keypad 204 can be configured in any desired arrangement.

The display 208 displays information such as group identification, transmission and reception frequencies, time/date, remaining power, incoming and dialed phone numbers, or information from the internet. The display 208 can be formed using LCD, OLED, or some other technology and be color or monochrome. The touch panel 210 has sensors to detect contact by a user digit or stylus. Placement of the various elements, such as the display 208 and touch panel 210, in the handset 200 as shown in the figures is merely exemplary. Similarly, although one handset layout is shown, different handset layouts may be used.

The keypad 204 can contain either or both soft and hard keys. Each key 206 can thus be either a soft key or a hard key. Hard keys are buttons having functions that are permanently displayed on the button. Soft keys are programmed by a processor (not shown) in the handset 200. The function of a soft key can change depending on the particular mode in which the handset 200 is operating. The function of the soft key is displayed on the display 208. Soft keys can also be disposed in the touch panel 210.

Initially, the handset 200 communicates with other devices using the channel selected by the channel selector 214. The channel selector 214 is, for example, a knob that has preset isolated choices. When the PTT button 202 is pressed initially, the handset 200 transmits and receives at the frequency selected by the channel selector 214.

Figure 3:
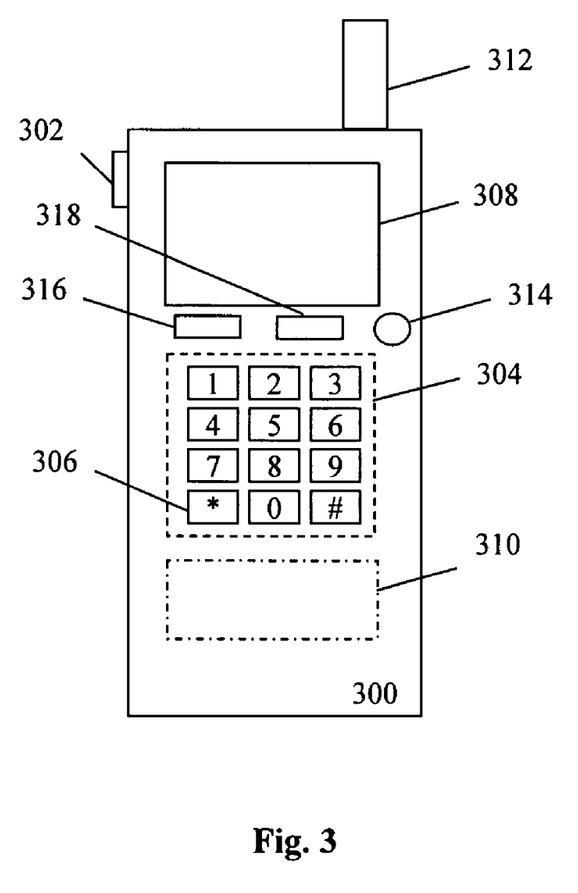
FIG. 3 illustrates a device according to another embodiment.

While the PTT button 202 initiates the PTT function, one or a combination of the keys 206 acts as a secondary PTT button when the multiple PTT function is activated. The multiple PTT function is activated either by pressing one or a combination of the keys 206 as shown in FIG. 2 or using a separate activation mechanism as shown in FIG. 3. The keys 206 act as alpha-numeric keys for non-PTT functions (i.e., permitting entry of alpha-numerical characters for telephony, messaging, information entry, or calculation for example) when the multiple PTT function is not activated or as PTT transmission selectors when the multiple PTT function is activated. In other embodiments, only some of the alpha-numeric keys may act as PTT transmission selectors when the multiple PTT function is activate; that is, the other keys act as alpha-numeric keys whether or not the multiple PTT function is activated. The number of alpha-numeric keys that act as PTT transmission selectors, as well as the frequencies used, can be pre-programmed prior to the handset 200 being shipped. Alternately, the alpha-numeric keys that act as PTT transmission selectors as well as the frequencies can be programmed by the user dependent on, for example, the number of groups as well as to which groups communication is desired. For user-programmed functionality, the available frequencies can be displayed and assigned using the display 208.

When the multiple PTT function is activated in addition to the PTT button 202 being activated, the handset 200 receives at one frequency, but can transmit at different frequencies without changing the channel selector 214. The particular transmission frequency is selected using one of the PTT keys 206 or multiple PTT keys 206 in combination. This will herein be referred to as a single PTT key for convenience. In some embodiments, the multiple PTT function may be activated at any time before or after the PTT button 202 is pressed while in other embodiments the multiple PTT function is able to be activated only before or only after the PTT button 202 is pressed.

The PTT key 206, once pressed, activates software in a processor (not shown) in the handset 200 to change the transmission frequency and transmit in another pre-programmed frequency. Similar to the PTT button 202, the PTT key 206 can remain locked and the multiple PTT function remain active until depressed. Alternately, a manual locking mechanism of the PTT key 206 can be optional and thus the multiple PTT function remains active only while the PTT key 206 is manually held in the active position or a separate end multiple PTT function key (shown as 318 in FIG. 3) is activated. In either case, activating the PTT key 206 changes the transmission frequency but does not change the receiving frequency. This allows the user of the handset 200 to monitor one frequency, while at the same time transmit to any group. Different PTT keys 206 or combinations of PTT keys can provide transmission at different frequencies. In some embodiments, when switching transmission from an old group to a new group a registration procedure is used to register the handset 200 on the new group before transmission to the new group is allowed. During this registration time, however, the user still receives on the original receiving channel. Thus, the handset 200 does not suffer a loss of information. To transmit on the original receiving frequency, the original channel is selected using the multiple PTT function or the multiple PTT function is deactivated. For the handset 200 to receive transmissions from other communication devices on a frequency different from the original receiving frequency, a different channel selector is chosen using the channel selector 214. As above, the number of groups with which a particular handset 200 is able to communicate depends on how many keys have been programmed by the factory or by the user to activate the multiple PTT function.

Another embodiment of the handset is shown in FIG. 3. In this embodiment, the handset 300 includes a PTT button 302, an alpha-numeric keypad 304 containing keys 306, an antenna 312, a channel selector 314, a PTT key 316, and, optionally, a display 308 and/or a touch panel 310. This arrangement is similar to the previous arrangement, except a dedicated PTT key 316 and optionally a separate end multiple PTT function key 318 are provided. The PTT key 316, once pressed, activates software in the handset processor to activate the multiple PTT function. As above, once the multiple PTT function is active, at least some of the keys 306 allow the user to change the transmission frequency such that the handset 300 transmits in a pre-programmed frequency dependent on the key 306 or combination of keys 306 pressed. The PTT key 316 can remain locked (and the multiple PTT function remain active) until depressed. Alternately, once the PTT key 316 has been used to activate the multiple PTT function, the end multiple PTT function key 318 can be used to deactivate the multiple PTT function. The end multiple PTT function key 318 is a soft or hard key.

Figure 4:
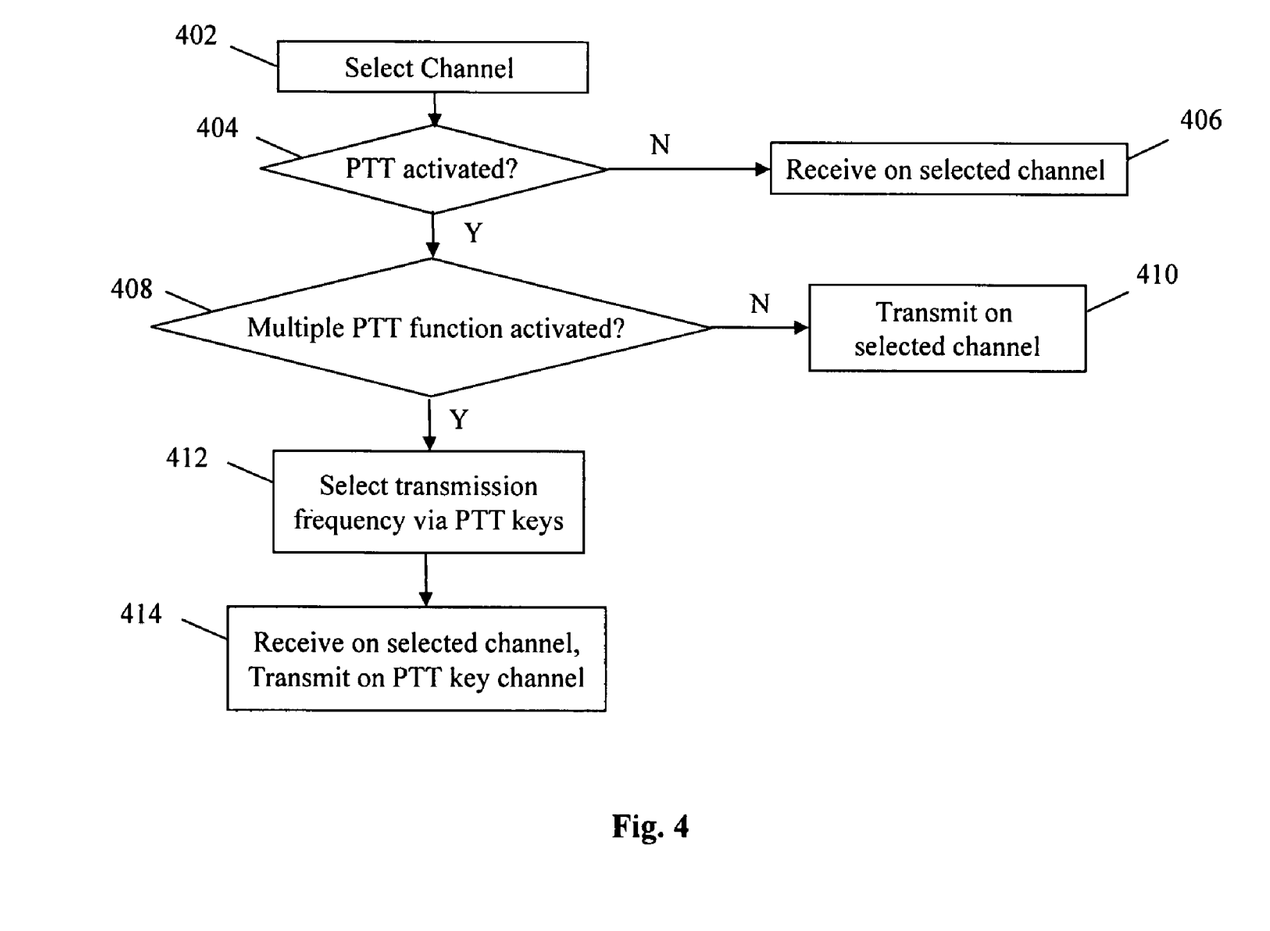
FIG. 4 illustrates a method according to one embodiment.

FIG. 4 illustrates an embodiment of a communication method using a PTT handset. As shown, the initial channel for reception and transmission is selected (402) using a channel selector. The processor determines whether the PTT button (404) is pressed. If the processor determines that the PTT button is not pressed, the handset receives on the selected channel (406). If the processor determines that the PTT button is pressed, the processor determines whether the multiple PTT function on the handset is activated (408). If the processor determines that the multiple PTT function on the handset is not activated, the handset transmits on the selected channel (410). If the processor determines that the multiple PTT function on the handset is activated, the software detects the PTT keys selected by the user (412). If the processor determines that the multiple PTT function on the handset is activated, the handset transmits on the channel selected by the PTT keys and receives on the initially-selected channel (414). Note that as described previously, various embodiments of the communication method exist and thus change the order of the steps shown in FIG. 4.

Figure 5:
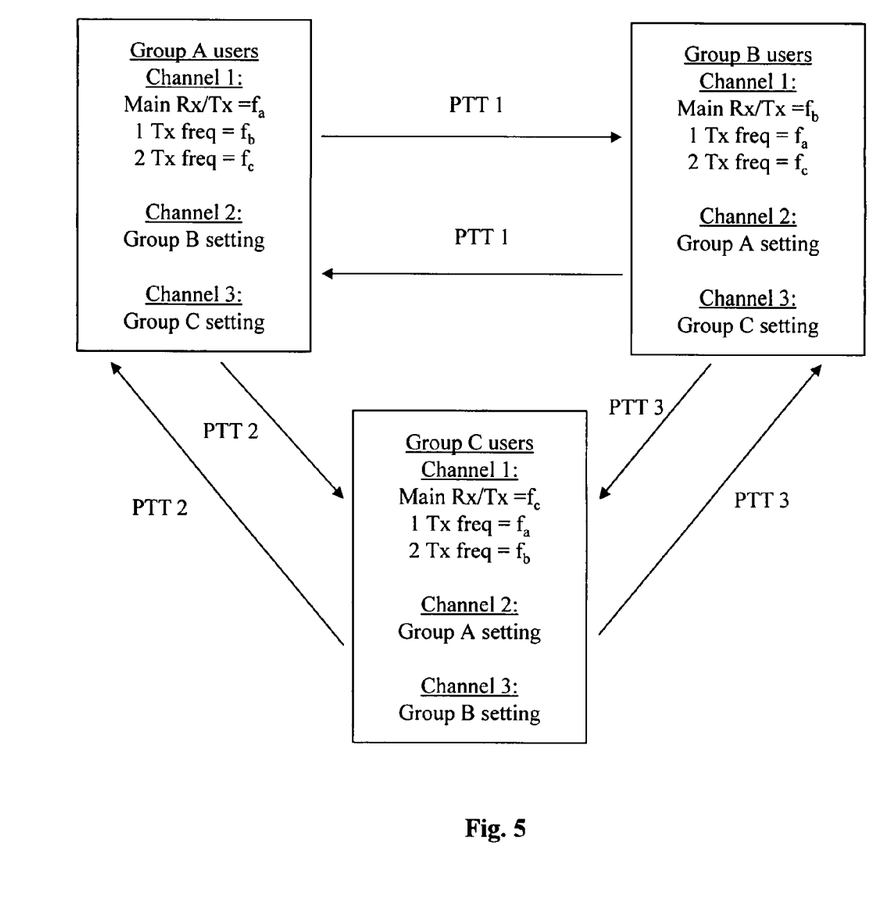
FIG. 5 illustrates communication links according to one embodiment.

One embodiment of the frequency selection for different devices in different groups is shown in FIG. 5. As illustrated, for users in group A, if channel 1 is selected by the channel selector and the PTT function is not activated, the frequency at which signals are received and transmitted is $f_a$. If channel 1 is selected by the channel selector, the PTT function is activated, and the key 1 is selected, the frequency at which signals are received is $f_a$ and the frequency at which signals are transmitted is $f_b$. If channel 1 is selected by the channel selector, the PTT function is activated, and the key 2 is selected, the frequency at which signals are received is $f_a$ and the frequency at which signals are transmitted is $f_c$. If channels 2 and 3 are selected, the reception and transmission are as described in groups B and C, respectively, below.

For users in group B, if channel 1 is selected by the channel selector and the multiple PTT function is not activated, the frequency at which signals are received and transmitted is $f_b$. If channel 1 is selected by the channel selector, the multiple PTT function is activated, and the key 1 is selected, the frequency at which signals are received is $f_b$ and the frequency at which signals are transmitted is $f_a$. If channel 1 is selected by the channel selector, the multiple PTT function is activated, and the key 2 is selected, the frequency at which signals are received is $f_b$ and the frequency at which signals are transmitted is $f_c$. If channels 2 and 3 are selected, the reception and transmission are as described in groups A and C, respectively.

For users in group C, if channel 1 is selected by the channel selector and the multiple PTT function is not activated, the frequency at which signals are received and transmitted is $f_c$. If channel 1 is selected by the channel selector, the multiple PTT function is activated, and the key 1 is selected, the frequency at which signals are received is $f_c$ and the frequency at which signals are transmitted is $f_a$. If channel 1 is selected by the channel selector, the multiple PTT function is activated, and the key 2 is selected, the frequency at which signals are received is $f_c$ and the frequency at which signals are transmitted is $f_b$. If channels 2 and 3 are selected, the reception and transmission are as described in groups A and B, respectively.

As shown in FIG. 5, when key 1 (PTT 1) is pressed on a device in Group A, the device transmits on frequency $f_b$ to a device in Group B. Similarly, when key 1 (PTT 1) is pressed on a device in Group B, the device transmits on frequency $f_a$ to a device in Group A. When key 2 (PTT 3) is pressed on a device in Group B, the device transmits on frequency $f_c$ to a device in Group C. Similarly, when key 2 (PTT 3) is pressed on a device in Group C, the device transmits on frequency $f_b$ to a device in Group B. When key 2 (PTT 2) is pressed on a device in Group A, the device transmits on frequency $f_c$ to a device in Group C. Similarly, when key 1 (PTT 2) is pressed on a device in Group C, the device transmits on frequency $f_a$ to a device in Group A.

Thus, the software maps the keys to specific groups, which can be device-dependent. As shown, the same key on different devices corresponds to the same transmission frequency or different transmission frequencies when the multiple PTT function is active dependent on the group to which the device belongs and the channel selected on the device.

Although only handsets have been described, the multiple PTT function may be used in other PTT devices such as cell phones. Rather than having a separate touch panel, the display may also operate as the touch panel.

Although the above describes an embodiment in which only a single frequency is received but that is capable of transmitting at multiple frequencies, other embodiments are possible. The radio may contain multiple receivers and/or transmitters which receive and/or transmit at different frequencies at the same time. With multiple receivers and/or transmitters, when a user in one group communicates with other user group, the transmission can also be received by the members in both groups. However, incorporating multiple receivers and/or transmitters in the handset may increase the handset cost substantially and may not alleviate the problem of multiple overlapping communications unless a channel priority scheme is also incorporated. Alternately, the device may scan preprogrammed frequencies when the multiple PTT feature is enabled so that the user can hear queries and responses to communication on the different frequencies.

It will be understood that the terms and expressions used herein have the ordinary meaning as is accorded to such terms and expressions with respect to their corresponding respective areas of inquiry and study except where specific meanings otherwise have been set forth herein. Relational terms such as first and second and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made and all equivalents of those claims as issued.

The invention claimed is:

1. A push-to-talk (PTT) device comprising:
   a channel selector that selects a first frequency on which to receive and transmit in accordance with a state of a PTT button;
   the PTT button configured to activates transmission of a first PTT signal from the device on the first frequency when pressed and to activate reception of a second PTT signal on the first frequency when not pressed;
   a multiple PTT key, different from the PTT button, that when pressed activates a multiple PTT function that selects a new transmission frequency on which to transmit, different from the first transmit frequency, while the reception frequency of the device remains at the first frequency; and
   a keypad containing a plurality of keys that, when the multiple PTT function is activated by the multiple PTT key, determine a new transmission frequency of the device on which to transmit, different from the first transmit frequency, dependent on a particular selection of one of more of the plurality of keys.

2. The PTT device of claim 1, wherein the multiple PTT key comprises a soft key.

3. The PTT device of claim 1, wherein the multiple PTT key comprises a hard key.

4. The PTT device of claim 1, wherein the multiple PTT key comprises a combination of two or more keys on the keypad.

5. The PTT device of claim 1, wherein the PTT key comprises a key that is separate from the keypad.

6. The PTT device of claim 1, further comprising a locking mechanism that locks the multiple PTT key when pressed such that when the multiple PTT key is pressed, the multiple PTT function remains active until the multiple PTT key is subsequently pressed again.

7. The PTT device of claim 1, further comprising a separate end multiple PTT key that, when pressed and the multiple PTT function is active, terminates the multiple PTT function.

8. The PTT device of claim 1, further comprising a display and a touch panel.

9. The PTT device of claim 1, wherein at least some of the keys act as alpha-numeric keys for non-PTT functions when the multiple PTT function is not activated.

10. The PTT device of claim 1, wherein each of the plurality of keys is associated with a pre-programmed alternative transmit frequency, and activation of one of the plurality of keys selects the corresponding alternative transmit frequency as the new transmission frequency of the device when the multiple PTT function is active.

11. A push-to-talk (PTT) network comprising a plurality of PTT devices, each of the PTT devices capable of belonging to a plurality of groups and comprising:
a channel selector that selects a first frequency on which to receive and transmit in accordance with a state of a PTT button dependent on a group to which the PTT device belongs;
the PTT button configured to activates transmission of a first PTT signal from the device on the first frequency when pressed and to activate reception of a second PTT signal on the first frequency when not pressed;
a multiple PTT key, different from the PTT button, that when pressed activates a multiple PTT function that selects a new transmission frequency on which to transmit, different from the first transmit frequency, while the reception frequency of the device remains at the first frequency; and
an input having a plurality of different input states that, when the multiple PTT function is activated by the multiple PTT key, determines a new transmission frequency of the device on which to transmit, different from the first transmit frequency, dependent on a particular input state selected.

12. The PTT network of claim 11, wherein in at least one of the PIT devices the multiple PTT key comprises a combination keys on a keypad.

13. The PTT network of claim 11, wherein in at least one of the PTT devices the multiple PTT key is a key that is separate from a keypad.

14. The PTT network of claim 11, wherein the input is one or more keys on a keypad.

15. The PTT network of claim 11, wherein:
selection of the same channel by PTT devices belonging to different groups results in different initial frequencies of both reception and transmission between the PTT devices belonging to the different groups,
the multiple PTT function shifts the transmission frequency such that the PTT devices belonging to the different groups and having the same channel selected are in communication when the multiple PTT function is active in at least one of the PTT devices belonging to the different groups and multiple PTT function is not active in at least one other of the PTT devices belonging to the different groups, and
not all of the PTT devices in communication belong to the same group.

16. A method of communicating with a plurality of push-to-talk (PTT) devices in a PTT network, the method comprising, on at least one of the devices:
selecting a first frequency to receive and transmit via a channel selector;
receiving a first PTT signal on the first frequency while a PTT button is not pressed;
transmitting a second PTT signal from the device on the first frequency while the PTT button is pressed;
detecting activation of a multiple PTT function via a multiple PTT key, different from the PTT button;
responsively selecting a new transmission frequency on which to transmit but not a new reception frequency when the multiple PTT function is activated by the multiple PTT key, the new transmission frequency being selected as a function of a particular selection of one or more of a plurality of input keys on a keypad; and
detecting deactivation of the multiple PTT function via the multiple PTT key, and responsively reverting to the first frequency for reception and transmission when the multiple PTT function is not active.

17. The method of claim 16, wherein the multiple PTT function is able to be activated only before the transmission is active.

18. The method of claim 16, wherein the multiple PTT function is only able to be activated when the transmission is active.

19. The method of claim 16, further comprising setting at least some alpha-numeric inputs for non-PTT functions when the multiple PTT function is not activated.

20. The method of claim 16, wherein selecting the new transmission frequency as a function of the particular selection of one or more of the plurality of input keys comprises associating each of the plurality of keys with a pre-programmed alternative transmit frequency, and activating of one of the plurality of keys to select the corresponding alternative transmit frequency as the new transmission frequency of the device when the multiple PTT function is active.

* * * * *

UNITED STATES PATENT AND TRADEMARK OFFICE
CERTIFICATE OF CORRECTION

PATENT NO. : 8,103,298 B2  
APPLICATION NO. : 12/125207  
DATED : January 24, 2012  
INVENTOR(S) : Ong et al.

Page 1 of 1

It is certified that error appears in the above-identified patent and that said Letters Patent is hereby corrected as shown below:

In Column 6, Line 24, in Claim 1, delete "activates" and insert -- activate --, therefor.

In Column 7, Line 8, in Claim 11, delete "activates" and insert -- activate --, therefor.

In Column 7, Line 25, in Claim 12, delete "PIT" and insert -- PTT --, therefor.

Signed and Sealed this
Eighteenth Day of December, 2012

David J. Kappos
*Director of the United States Patent and Trademark Office*